(12) United States Patent
Tsutsui

(10) Patent No.: US 6,237,841 B1
(45) Date of Patent: May 29, 2001

(54) RETAINER FOR SELF-STANDING PACKAGING BAGS SUPPLIED TO A BAG-PACKING PACKAGING MACHINE

(75) Inventor: Shoji Tsutsui, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 0 days.

(21) Appl. No.: 09/504,601

(22) Filed: Feb. 15, 2000

(30) Foreign Application Priority Data

| Feb. 15, 1999 | (JP) | ................................................. 11-035931 |
| Dec. 21, 1999 | (JP) | ................................................. 11-363532 |

(51) Int. Cl.$^7$ ...................................................... B65D 3/00
(52) U.S. Cl. ..................................... 229/117.35; 383/104
(58) Field of Search ........................ 206/554; 220/495.06, 220/495.08; 383/104; 229/117.27, 117.35

(56) References Cited

U.S. PATENT DOCUMENTS

| 2,180,841 | * | 11/1939 | Vogt ...................................... 383/104 |
| 3,272,423 | * | 9/1966 | Bjarno ................................... 383/104 |
| 3,521,807 | * | 7/1970 | Weisberg ........................... 229/117.35 |
| 5,967,320 | * | 10/1999 | Cappels ................................. 206/434 |

\* cited by examiner

Primary Examiner—David T. Fidei
(74) Attorney, Agent, or Firm—Koda & Androlia

(57) ABSTRACT

A retainer with a bottomed retaining hole and a pair of insertion grooves so that a self-standing packaging bag in a closed state is set in the retaining hole and insertion grooves and then the bag is opened and kept opened during packaging operations. The retaining hole that is vertically formed accommodates the body portion of the self-standing packaging bag, and both side edges of the bag are inserted in the insertion grooves which are vertically installed in symmetrical positions on both sides of the retaining hole. The depth of the bottomed retaining hole and insertion grooves is set to be smaller than the length of the self-standing packaging bag, the spacing between the end portions of the insertion grooves is set to be equal to or greater than the width of an unopened self-standing packaging bag, and the angle between the inside surfaces of the retaining hole and insertion grooves is set at or about 90 degrees.

11 Claims, 12 Drawing Sheets

RETAINER FOR SELF-STANDING PACKAGING BAGS SUPPLIED TO A BAG-PACKING PACKAGING MACHINE

BACKGROUND OF THE INVENTION

1. Field of the Invention

The present invention relates to a retainer for accommodating a self-standing packaging bag that can stand by itself in an open state and for supplying such bags to a bag-packing packaging machine.

2. Prior Art

Japanese Patent Application Laid-Open (Kokai) No. S58-73501 discloses one type of a bag-packing packaging machine.

This machine is designed so that packaging bags (which are empty) are accommodated in retainers, and the retainers are continuously conveyed. Various packaging operations such as filling the bags with contents to be packaged and sealing the bag openings, etc. are performed during the conveying process.

Each retainer is provided with a hollow space and a pair of vertical side grooves. The hollow space has a shape that corresponds to the cross-sectional configuration of the body portion of the packaging bag in an open state (i.e., a state in which the opening of the bag is open and the body portion of the bag is inflated), and the pair of vertical side grooves guide the side edges of the packaging bag. The packaging bag in a closed state is put in the hollow space and is opened and filled with the contents by a filling device.

Accordingly, the above-described filling device requires a bag-opening means such as a vacuum suction picker; and as a result, the structure of the device is extremely complicated. Furthermore, the retainer does not have any means for maintaining the opened packaging bag "as is" in its open state. Accordingly, even though the packaging bag once opened has some degree of shape retention if the bag is a self-standing bag, the bag opening tends to close as a result of vibration during the conveying process and of the recovery force of the packaging bag itself. Thus, when the bag is successively filled with liquid and solid substances during the conveyance, it is necessary to install a bag-opening means for each of liquid and solid substances in the filling devices.

Another prior art, Japanese Utility Model Application Laid-Open (Kokai) No. S58-904 discloses that an open self-standing packaging bag (empty bag) is placed in a retainer, the retainer is successively conveyed to a filling station and sealing station, etc., and various packaging operations such as filling of the bag with contents and sealing of the bag opening, etc. are successively performed.

The retainer of this prior art includes a plate which has a retaining hole and insertion grooves. The retaining hole is in a shape that more or less coincides with the cross-sectional shape of the body portion of a self-standing packaging bag of an open state, and the insertion grooves are formed so that both side edges of the packaging bag are inserted and held therein. Thus, in this retainer, the packaging bag of an open state is set in the retaining hole and insertion grooves of the plate. However, there is no clear description about the means that keeps the open state of the bag in this prior art; therefore, it appears that the bag opening cannot be prevented from closing by way of recovery force of the packaging bag.

Still another prior art, Japanese Patent Application Laid-Open (Kokai) No. H10-236448 discloses a retainer that is equipped with a packaging bag retaining means. With this retainer, a packaging bag is held in an open state, and the bag can be reliably positioned at a specified location. However, the structure of the retainer of this prior art is complicated, and the maintenance and cleaning is not accomplished easily.

SUMMARY OF THE INVENTION

The present invention is devised in light of the problems with the above-described conventional retainers.

The primary object of the present invention is to provide a retainer which can maintain the open state of a self-standing packaging bag during various packaging operations after the self-standing packaging bag is set in the retainer in a closed state. Also, the retainer of the present invention does not have a complicated structure.

More specifically, the self-standing packaging bag retainer according to the present invention is characterized by the fact that: a bottomed retaining hole, which has a cross section that is capable of accommodating the body portion of an open self-standing packaging bag, is vertically formed; a pair of insertion grooves into which both side edges of the self-standing packaging bag are inserted are vertically formed in diametric positions of the retaining hole; the depth of the bottomed retaining hole and the insertion grooves is set so as to be smaller than the length (or height) of the self-standing packaging bag; and the outside surface of the open self-standing packaging bag contacts the inside surface of the retaining hole or the inside surfaces of the boundary areas between the retaining hole and the insertion grooves; so that the self-standing packaging bag is prevented from closing once it is put in the retainer.

In the above structure, it is desirable that the angle formed by the direction of an imaginary extension line of the inside surfaces of the bottomed retaining hole and the direction of an imaginary extension line of the insertion grooves in the boundary areas between the bottom retaining hole and the insertion grooves be set exactly at or about 90. This angle can vary according to the width of the insertion grooves, the shape and material of the boundary areas, the material of the packaging bag, and other factors. The object of the present invention can be achieved by setting the above-described angle at an angle of up to approximately 110 degrees. A desirable (horizontal) cross-sectional shape for the bottomed retaining hole is circular, elliptical, racetrack-shaped and some other shapes similar to these shapes. In other words, a cross-sectional shape which conforms to the outer configuration of the body portion of the packaging bag in an open state, or a rectangular cross-sectional shape, etc. may be employed.

Furthermore, the retainer of the present invention may be provided with projections in the boundary areas between the retaining hole and insertion grooves. The projections respectively protrude inward or toward the inside of the retaining hole and are formed continuously on the inside surfaces of the retaining hole. With these projections, the side surfaces of the opened self-standing packaging bag come into contact with the projections so that the self-standing packaging bag is prevented from closing. The projections can be formed separate from the retainer main body. In this case, the projections are designed so as to undergo elastic deformation and to be oriented toward the inside of the retaining hole so that the spaces between the tip ends of the adjacent projections become narrower toward these tip ends. The opened packaging bag is prevented from closing with the use of the thus structured projections.

Furthermore, in the above-described retainer, it is also possible to form a pair of suction plate insertion holes. Preferably, these holes are formed in the lower portions of the side walls of the retainer so that the suction plate insertion holes are oriented perpendicular to the insertion grooves and pass through the retainer from the outer circumferential surface to the retaining hole. With this structure, when the bag in the retainer is opened, a pair of suction plates are inserted via the suction plate insertion holes, and both surfaces of the lower portion of the bag are pulled toward both sides of the retainer (in this case, the upper portion of the bag, i.e., the portion protruding from the retainer, is also simultaneously pulled toward both sides of the retainer). Thus, the self-standing bag can be more or less uniformly opened from its bottom to the bag opening. When the bag is thus opened, it is preferable to blow compressed air into the interior of the bag through the bag opening.

Furthermore, in the retainer of the present invention, printing holes may be formed in appropriate positions in one or both side walls of the retainer. The printing holes are oriented perpendicular to the insertion grooves and pass through the retainer from the outer circumferential surface to the retaining hole. Ink from the print head of an ink jet printer can be sprayed onto the surfaces of the packaging bag through these printing holes so as to print, for instance, the date of manufacture on the bag.

Furthermore, each of the insertion grooves of the retainer of the present invention may be divided into a lower region and an upper region. The lower region has substantially vertical inside wall surfaces extending from the bottoms of the insertion grooves to a specified height, and the upper region has inside wall surfaces that are continuous to the inside wall surfaces of the lower region and are inclined outward toward the top of the retainer. With this structure, when both side edges of the filled packaging bag are gripped and pulled laterally (to the left and right) by a gripping means during heat sealing process of the bag, both side edges of the packaging bag can easily enter the upper regions of the insertion grooves without any great resistance.

When a closed self-standing packaging bag is set in the retainer, the spacing between end portions of the pair of insertion grooves needs to be equal to or greater than the width of the bag in a closed state. Moreover, when an open self-standing packaging bag is set in the retainer, the spacing between the end portions of the pair of insertion grooves needs to be equal to or greater than the width of bag in an open state. Accordingly, for bags of the same width, the spacing between the end portions of the pair of insertion grooves can be set at a smaller value when the bag is set in the retainer in the closed state and not in an open state.

DETAILED DESCRIPTION OF THE PREFERRED EMBODIMENTS

Figure 1A:
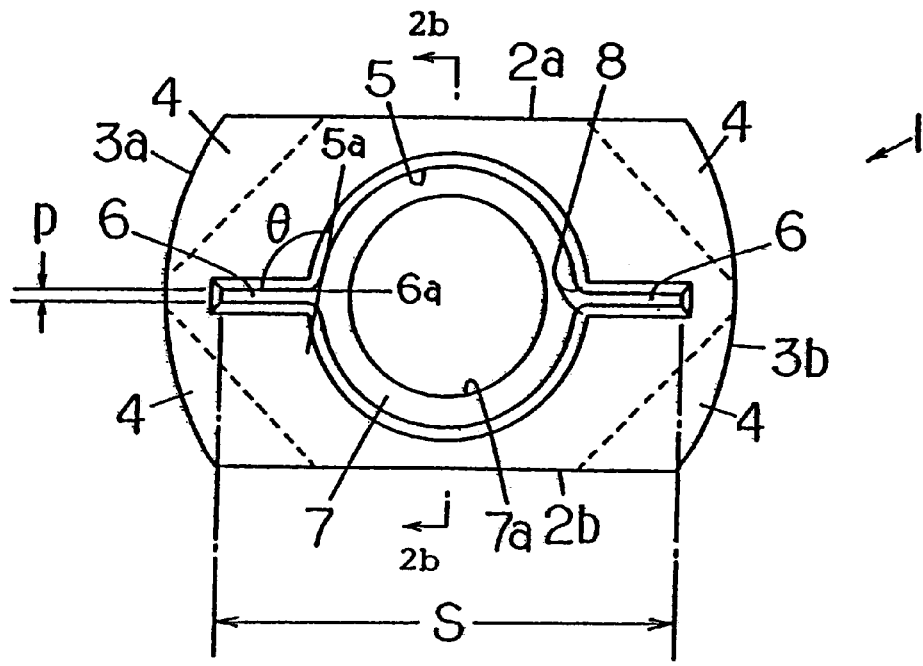
FIG. 1(*a*) is a top view of the retainer according to one embodiment of the present invention, and FIG. 1(*b*) is a front view thereof.
Figure 1B:
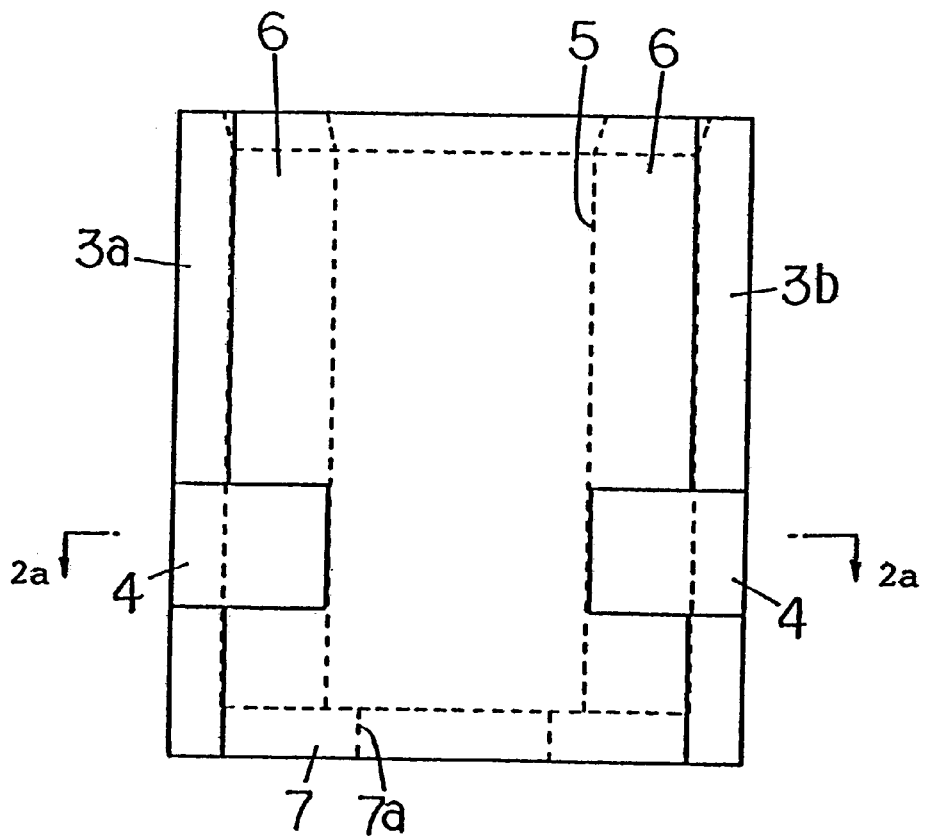
Figure 2A:
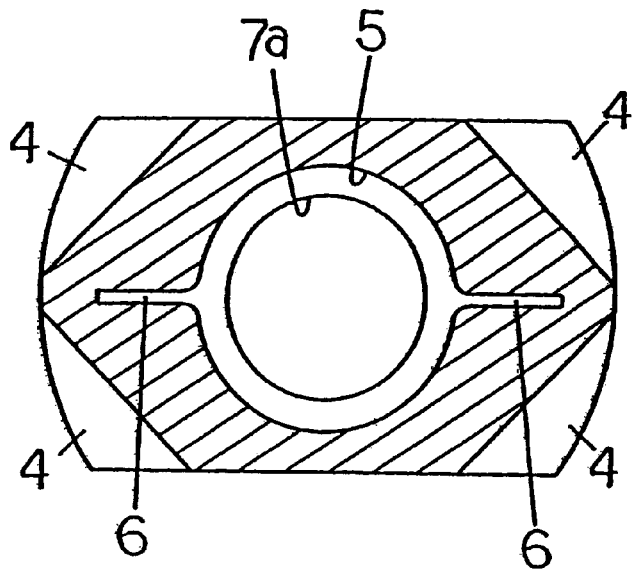
FIG. 2(*a*) is a cross sectional view taken along the line 2*a*—2*a* in FIG. 1(*b*), and FIG. 2(*b*) is a cross sectional view taken along the line 2*b*—2*b* in FIG. 1(*a*)
Figure 2B:
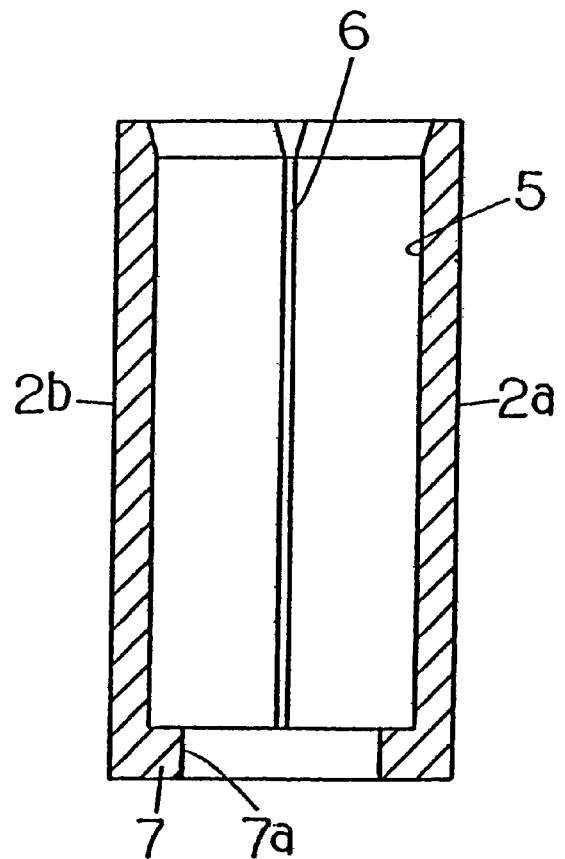

The retainer 1 shown in FIGS. 1(*a*), 1(*b*), 2(*a*) and 2(*b*) has an outer circumferential shape that comprises mutually parallel flat surfaces 2*a* and 2*b* and arc-shaped surfaces 3*a* and 3*b* which connect these flat surfaces 2*a* and 2*b* (i.e., the retainer has the external shape that is formed by making parallel longitudinal cuts on both sides of a solid cylinder). Groove-shape engaging cut-outs 4 which are cut in a V shape from the arc-shaped surfaces 3*a* and 3*b* toward the respective flat surfaces 2*a* and 2*b* are formed at locations approximately ⅓ from the bottom.

Furthermore, a retaining hole 5 which has a bottom and which has a circular cross section is formed in the vertical direction inside the retainer 1. Also, a pair of insertion grooves 6 are formed in symmetrical or diametrical positions on both sides or on the left and right of the bottomed retaining hole 5. Both insertion grooves 6 have the same depth as each other with respect to the vertical direction as shown in FIGS. 1(*b*) and 2(*b*). A hole 7*a* which passes through to the outside of the retainer 1 is formed in the center of the bottom 7 of the retaining hole 5 and insertion grooves 6.

The retaining hole 5 has a size and cross-sectional shape that allows the accommodation of the body portion of an open self-standing packaging bag, and the spacing S between the walls of the end portions of the pair of insertion grooves 6 (see FIG. 1(*a*)) is set to be equal to or greater than the width of the packaging bag in a closed state. Furthermore, the boundary areas 8 between the inside wall surfaces of the retaining hole 5 and insertion grooves 6 are formed with curvatures R by chamfering. Also, the angle θ defined by an imaginary linear extension line (tangent) 5*a* of the inside surfaces of the retaining hole 5 and an imaginary linear extension line 6*a* of the inside surfaces of the insertion grooves 6 is set to be fairly close to 90 degrees.

Each of the insertion grooves 6 has a pair of more or less perpendicular inside wall surfaces and end portion walls that face each other. Only the upper end portions of the insertion grooves 6 are inclined upward and outward in the shape of a hopper, so that side edges of a packaging bag can be easily brought into the insertion grooves 6.

Figure 3:
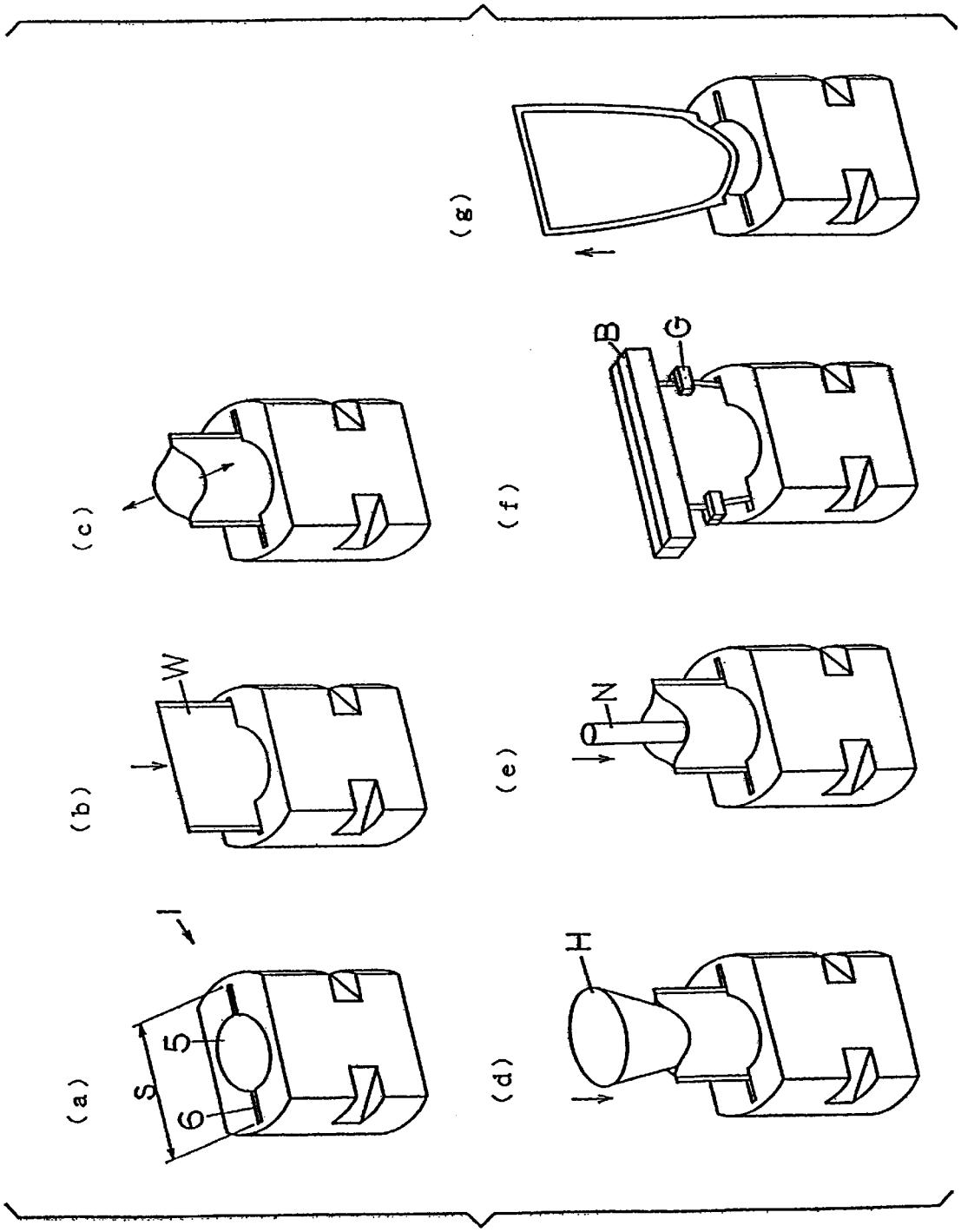
FIG. 3 is shows one example of a process of a method of use of the retainer of the present invention.

The retainer 1 thus formed is continuously conveyed; and during the conveying process, various packaging operations such as filling with contents and sealing of the bag opening, etc. are performed on the self-standing packaging bag accommodated in the retainer 1. One example of this process is shown by way of steps (a) through (g) in FIG. 3.

Step (a): The empty retainer 1 is conveyed to a packaging bag supply position.

Step (b): A packaging bag W is set in the retainer 1 with its part of the body portion and its side edges in the insertion grooves 6 of the retainer 1. In this step, the packaging bag W is in a closed state. Since the spacing S between the walls of the end portions of the insertion grooves 6 are equal to or greater than the width of the bag W, the bag can easily be set in the retainer 1.

Figure 4A:
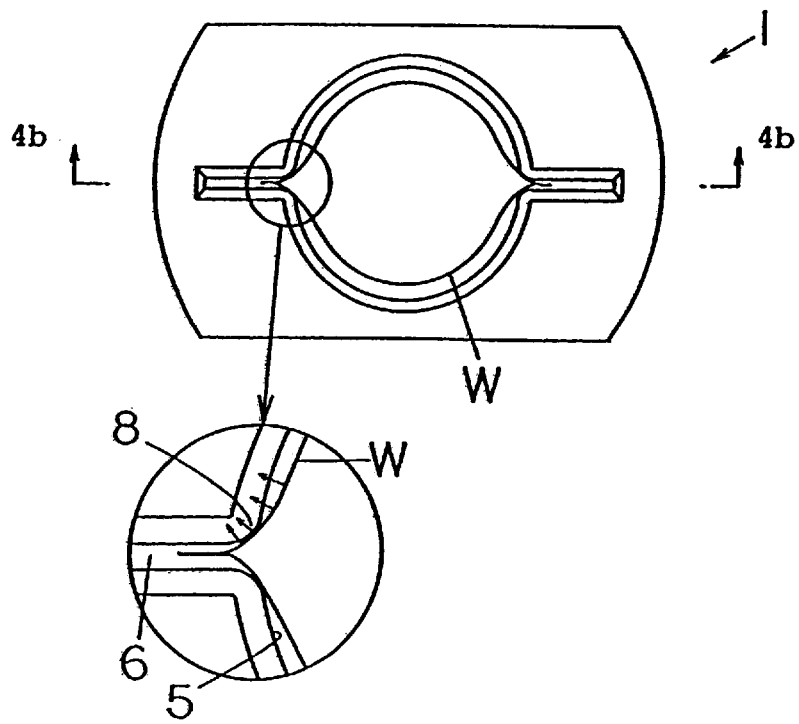
FIG. 4(*a*) is a top view of the retainer and a self-standing packaging bag accommodated in the retainer in an open state, and FIG. 4(*b*) is a sectional view taken along the line 4*b*—4*b* in FIG. 4(*a*)
Figure 4B:
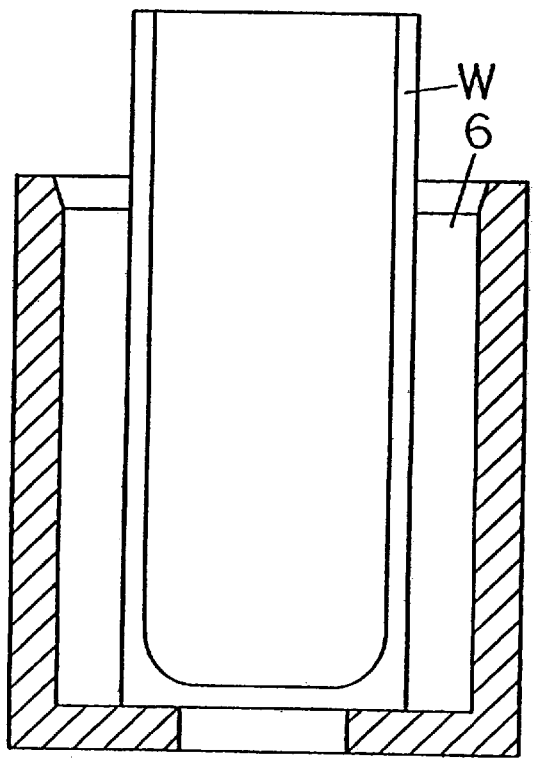

Step (c): The bag is opened by an opening device such as vacuum suction plates, etc. at a bag-opening position. If necessary, the bag is opened by blowing air into the interior of the bag. As a result of this opening action, the body portion of the packaging bag W expands (or inflated) in the retaining hole 5 of the retainer 1, and the part of the body portion of the bag W in the insertion grooves 6 is withdrawn from the insertion grooves, leaving the end edges of the bag W (see FIG. 4) in the insertion grooves 6.

Step (d): The retainer 1 is further conveyed; and at a solid content filling position, a hopper H is inserted into the bag opening, and the opened packaging bag W is filled with solid contents.

Step (e): Next, at a liquid content filling position, a nozzle N is inserted into the bag, and the packaging bag W is filled with liquid contents.

Step (f): At a sealing position, both edges of the packaging bag W are pulled side-way by grippers G so that the upper edge of the bag opening is closed; at the same time, the bag opening is heat-sealed by sealing bars B.

Step (g): At a discharge position, the sealed packaging bag W is taken out of the retainer; and the retainer is collected and conveyed back to the packaging bag supply position.

Generally, the open self-standing packaging bag has some degree of shape retention characteristics (a property of tending not to return to its original state). However, the bag opening tends to be closed as described above due to the vibrations during conveying and the recovery force of the packaging bag itself. When the retainer 1 of the present invention is used, the outer surfaces of the packaging bag W come into contact with portions near the boundary areas 8 that are between the retaining hole 5 and the insertion grooves 6; as a result, recovery (or closing) of the packaging bag is prevented, and the bag can be held in more or less the initial open state during conveying and the subsequent filling process.

The reason that the recovery or closing of the opening is prevented is as follows: in the above-described retainer 1, the retaining hole 5 has a circular cross section, and the angle θ defined by the extension line 5a of the inside surfaces of the retaining hole 5 and the extension line 6a of the inside wall surfaces of the insertion grooves 6 is set so that this angle is about 90 degrees; accordingly, almost all of the recovery force (or closing force) of the packaging bag W in an open state becomes a component that presses perpendicularly against the inside surfaces of the retaining hole 5 and boundary areas 8, and the component that is oriented along the outer surfaces of the packaging bag W (i.e., the component that acts to pull the bag out of the insertion grooves 6) becomes extremely small.

In order to prevent closing of the opening of the bag in this way, it is desirable that the angle θ is set to be about 90 degrees. By way of disposing an element that has a large coefficient of friction (e. g., rubber) on the inside surfaces of the retaining hole 5 and/or the inside surfaces of the boundary areas 8, the permissible range of this angle θ can be increased.

Figure 5A:
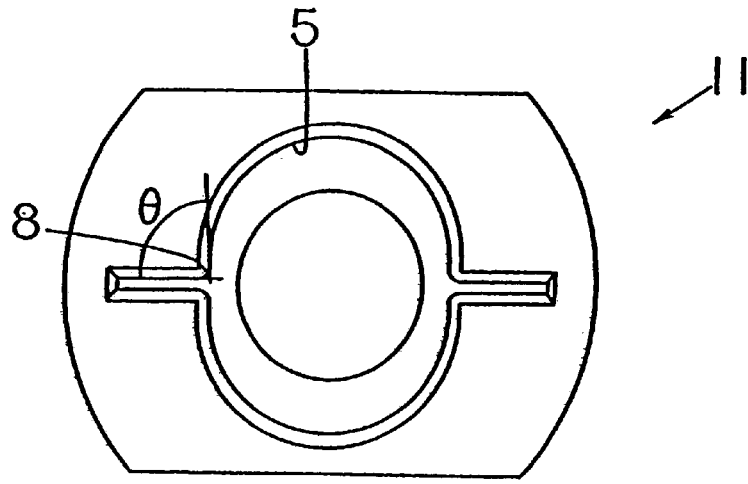
FIGS. 5(*a*), 5(*b*) and 5(*c*) are top views of the retainers according to other embodiments of the present invention.
Figure 5B:
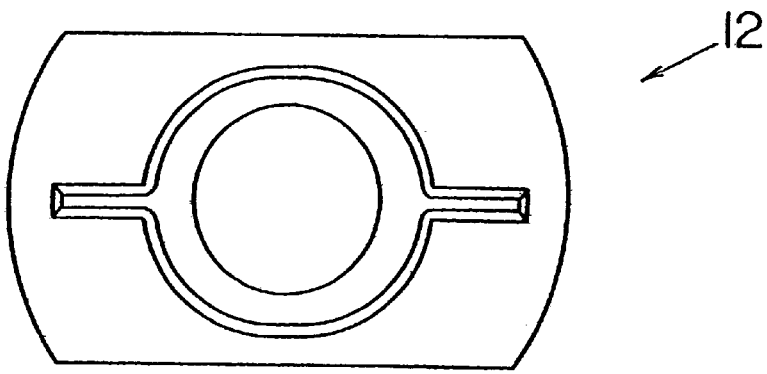
Figure 5C:
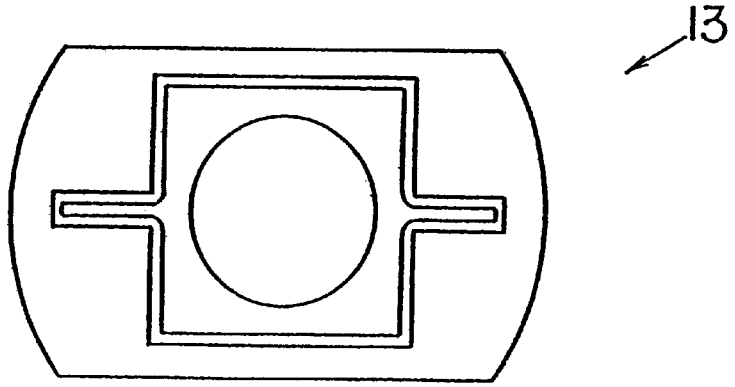

It is also possible to set the angle θ to be less than 90 degrees as seen in the retainer 11 shown in FIG. 5(a). This arrangement is effective in preventing recovery or closing of the bag; however, with this arrangement, the inside surfaces of the retaining hole 5 protrude slightly inward in the vicinity of the boundary areas 8, and the resistance during bag opening process tends to increase. Accordingly, it is desirable that the angle θ not be set at an angle of any less than approximately 80 degrees. The retainers 12 and 13 shown in FIGS. 5(b) and 5(c) illustrate other examples of the retainer that have different retaining hole shapes.

In the above-described retainers 1 and 11 through 13, a narrower width P of the insertion grooves is more effective in preventing recovery or closing of the open packaging bag W. However, if the width P is too narrow, it is difficult to accomplish a quick set of the packaging bag W in the retainer. Furthermore, the curvature R of the boundary areas 8 is provided so as to prevent damages and pinholes in the bag surfaces when the packaging bag W is pulled out of or brought into the insertion grooves. However, if this curvature is too great, the bag can easily be closed by itself. Accordingly, the width P and the curvature R of the boundary areas should be set in view of the above-described factors and with comprehensive consideration given to the size of the angle θ and the materials of the boundary areas and packaging bag, etc. For a standard self-standing packaging bag (that has a bag width of approximately 60 to 150 mm), these values may be determined using an insertion groove width P of approximately 1 to 5 mm (i.e., in terms of the relationship to bag thickness, a width of (bag thickness +3 mm) or less) and a boundary area curvature radius R of approximately 1 to 5 mm as guidelines.

Figure 6:
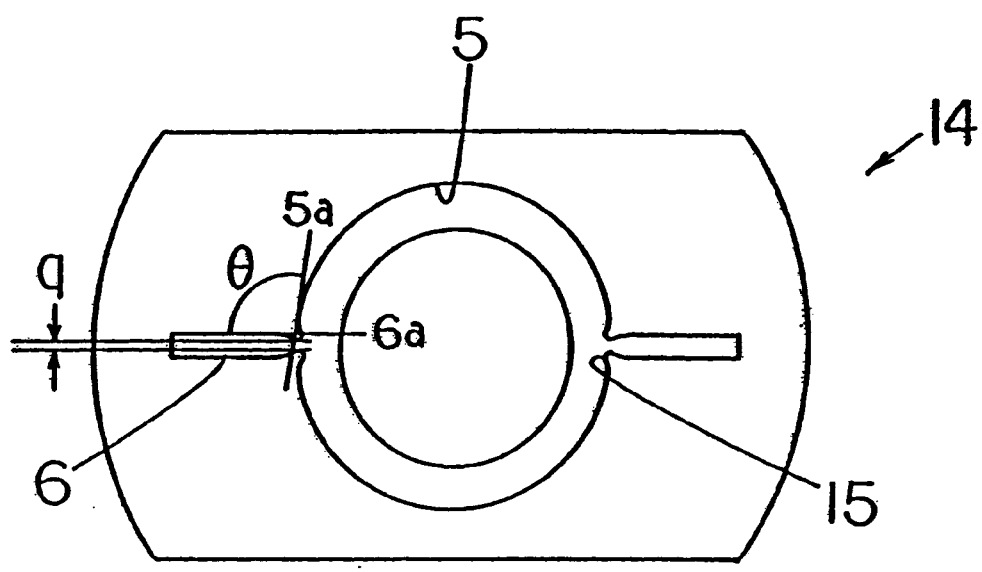
FIG. 6 shows still another retainer according to another embodiment of the present invention.

FIG. 6 shows another embodiment of the retainer of the present invention in which the shapes of the retaining hole and insertion grooves are different from those of the previous embodiments.

In the retainer 14 shown in FIG. 6, projections 15 are integrally formed in the boundary areas between the retaining hole 5 and the insertion grooves 6. These projections 15 are oriented toward the inside of the retaining hole 5 and protrude in such a direction that the projections 15 approach each other. The surfaces of the projections 15 are formed so as to be smoothly continuous to the inside surfaces of the retaining hole 5 and insertion grooves 6. The angle θ between an imaginary linear extension line 5a of the retaining hole 5 and an imaginary linear extension line 6a of the insertion grooves 6 is slightly greater than 90 degrees. In this retainer 14 of FIG. 6, however, since the projections 15 are formed so as to substantially constitute portions of the inside surfaces of the retaining hole 5, the substantial angel θ is similar to that of the retainer 11 described in the previous embodiment, thus assuring a good recovery-preventing effect. The spacing q of the tip ends of the projections 15 is determined based upon the same factors as the previously described width P of the insertion grooves.

The reason that the mutually parallel flat surfaces 2a and 2b are formed in the retainer of the present invention is to insure proper directional characteristics during automated conveying by means of a conveyor, etc. The reason that the hole 7a is formed in the bottom 7 of the retainer is to allow drainage of cleaning water. Furthermore, the V-shaped engaging cut-outs 4 formed in the outer circumferential surface of the retainer 1 are used for positioning the retainer by means of a corresponding anchoring means when the conveying is stopped. It goes without saying that the engaging cut-outs 4 may have various shapes depending upon the type of anchoring means used and other factors. Also, anchoring holes such as those described in the above-referred Japanese Patent Application Laid-Open (Kokai) No. H10-236448 may be employed.

Furthermore, by forming a part of the outer circumferential shape in the direction of height in a cylindrical shape as shown in the retainer 21 which will be described later (this is not shown in the structure of the above-described retainer 1), such a cylindrical portion can be used as a guide when the retainer is conveyed by a conveyor (see FIG. 7). Furthermore, this type of retainer can be transferred in a stable fashion from the conveyor to a star wheel, which is commonly used when conveying such retainers to a filling device. In this case, the stability during conveying by a conveyor, etc. is further increased by forming the lower portion of the retainer in a cylindrical shape. Moreover, the useful life of the retainer can be extended by employing (preferably in a detachable manner) a slip material that has a small coefficient of friction and a large wear resistance (resin, metal, ceramic, etc.) for the bottom of the retainer, or by fastening (preferably in a detachable manner) a protective member to the outer circumferential surface (especially to the portions that contact guide members, etc. of the conveying means).

Figure 7A:
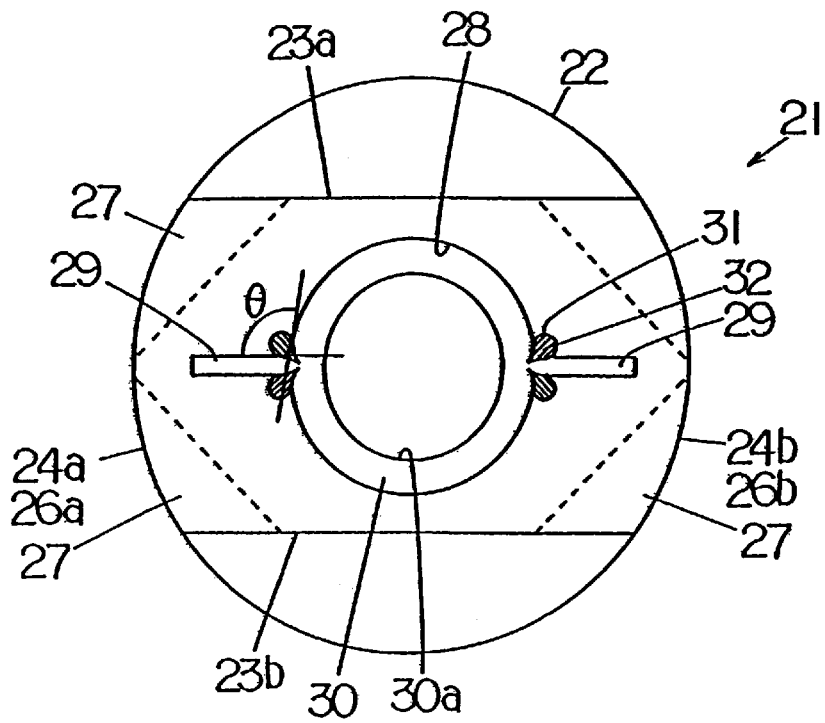
FIG. 7(*a*) is a top view of the retainer according to still another embodiment of the present invention, and FIG. 7(*b*) is a front view thereof.
Figure 7B:
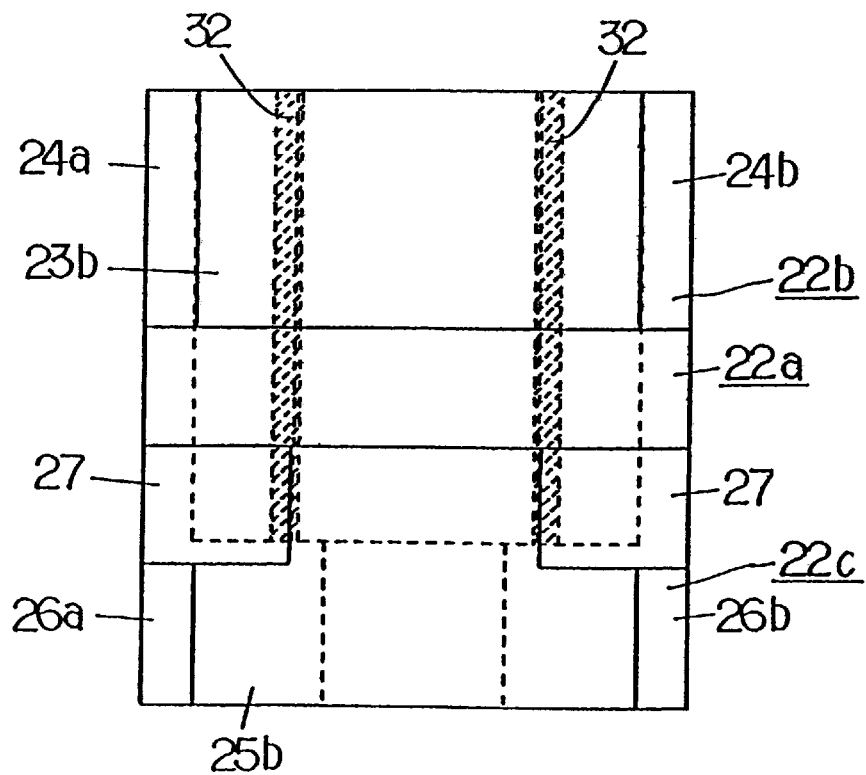
Figure 8:
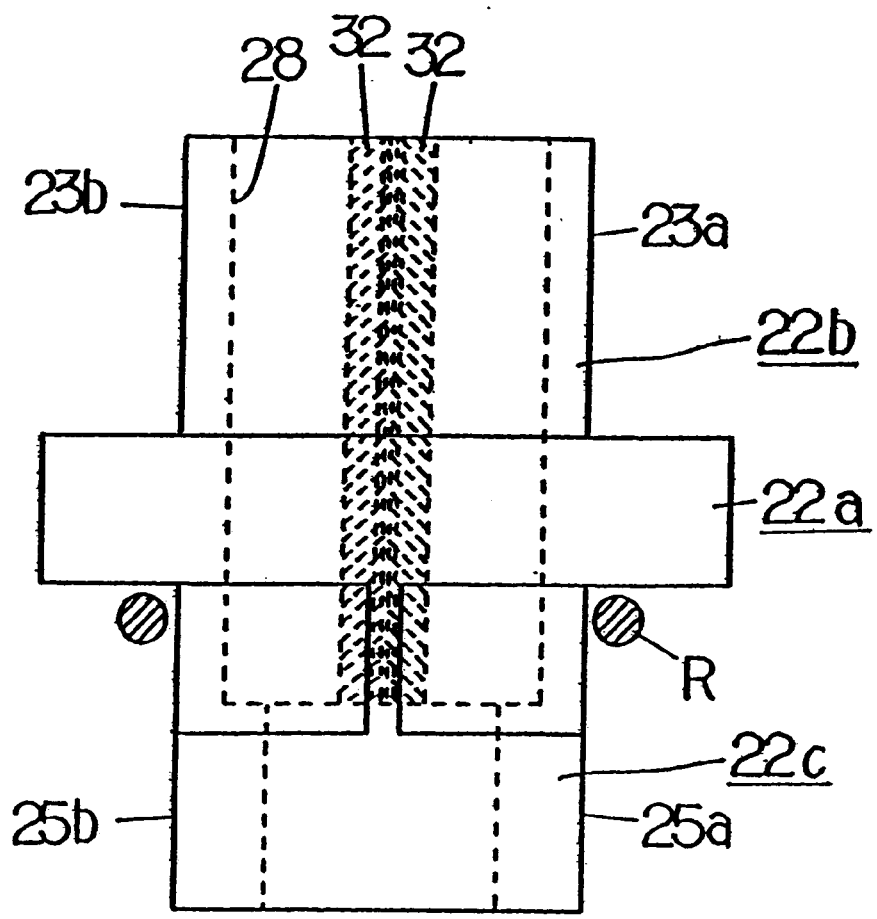
FIG. 8 is a side view of the retainer shown in FIGS. 7(*a*) and 7(*b*)

FIGS. 7(a), 7(b) and 8 show further embodiments of retainer of the present invention.

The retainer 21 of this embodiment comprises a central part (cylindrical part) 22a which has a cylindrical outer circumferential shape, an upper part 22b which consists of mutually parallel flat surfaces 23a and 23b and arc-shaped surfaces 24a and 24b that connected the flat surfaces 23a and 23b, and a lower part 22c which also consists of mutually parallel flat surfaces 25a and 25b and arc-shaped surfaces 26a and 26b that connect the flat surfaces 25a and 25b. Furthermore, as best seen from FIG. 7(a), groove-shape engaging cut-outs 27 which are cut in a V shape from the arc-shaped surfaces 26a and 26b toward the respective flat surfaces 25a and 25b are formed in the lower part 22c immediately beneath the cylindrical part 22a.

Furthermore, a retaining hole 28 which has a bottom and which has a horizontally circular cross section is formed in the vertical direction inside the retainer 21, and a pair of insertion grooves 29 are formed to the same depth in the vertical direction. A hole 30a which passes through to the outside of the retainer is formed in the center of the bottom 30 of the retaining hole 28 and insertion grooves 29. Moreover, attachment grooves 31 are formed in the vertical direction in the boundary areas between the retaining hole 28 and the insertion grooves 29, and soft rubber projections 32 which possess elasticity are fitted in these attachment grooves 31 so as to face inward. The surfaces of the projections 32 are formed so as to be smoothly continuous to the inside surfaces of the retaining hole 28. As best seen from FIG. 7(a), the space between the tip ends of the adjacent two projections 32 narrows toward the tip ends of the projections 32, so that the tip ends lightly contact both sides of a packaging bag.

In this retainer 21, since the projections 32 are fitted in the attachment grooves 31 so that the projections 32 face inward (or face the retaining hole 28), and since the space between the tip ends of the projections 32 is set so as to be narrow, a part of the body portion of the packaging bag (not shown) is withdrawn from the insertion grooves 29 without any great resistance when that the bag is opened and inflated; however, the projections 32 provides a great resistance against the recovery force (or closing) of the packaging bag. As a result, vibration during conveying and the recovery force of the bag are resisted and the packaging bag is maintained "as is" in an open state. Furthermore, the angle θ defined by the extension line 28a of the retaining hole 28 and the extension line 29a of the insertion grooves 29 is about 90 degrees, and the projections 32 are formed so as to virtually constitute a part of the retaining hole 28 as in the retainer 14 of the previous embodiment; and these features are also effective in preventing recovery or closing of the packaging bag.

The functions of the other elements of the above-described retainer 21 are similar to those of the retainer 1 of the previous embodiment. The central part 22a is in a cylindrical shape and bulges out in the form of a flange as seen from the side as shown in FIG. 8; and positional deviation of the retainer 21 is prevented by causing the central part 22a to slide on, for instance, guide bars R that are disposed on the conveyor. Furthermore, transfer to a star wheel can be stably accomplished as described above.

Figure 9A:
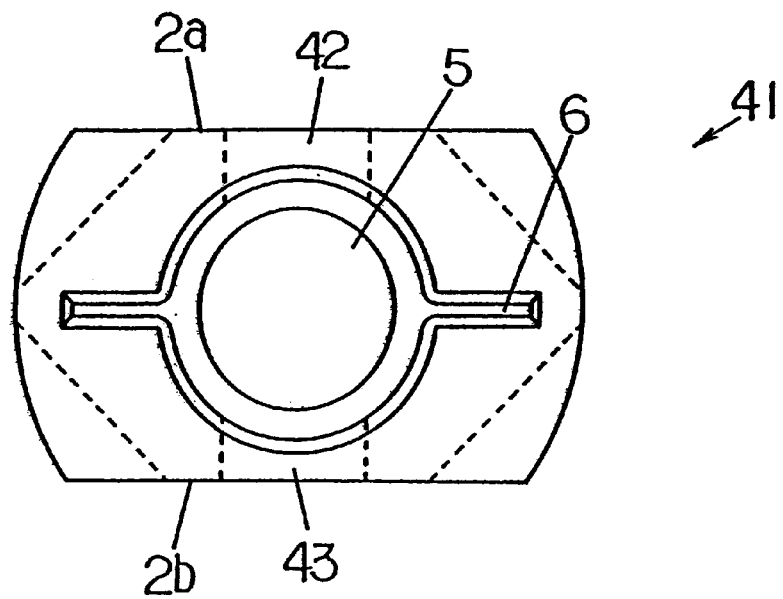
FIG. 9(*a*) is a top view of the retainer according to still another embodiment of the present invention, and FIG. 9(*b*) is a front view thereof.
Figure 9B:
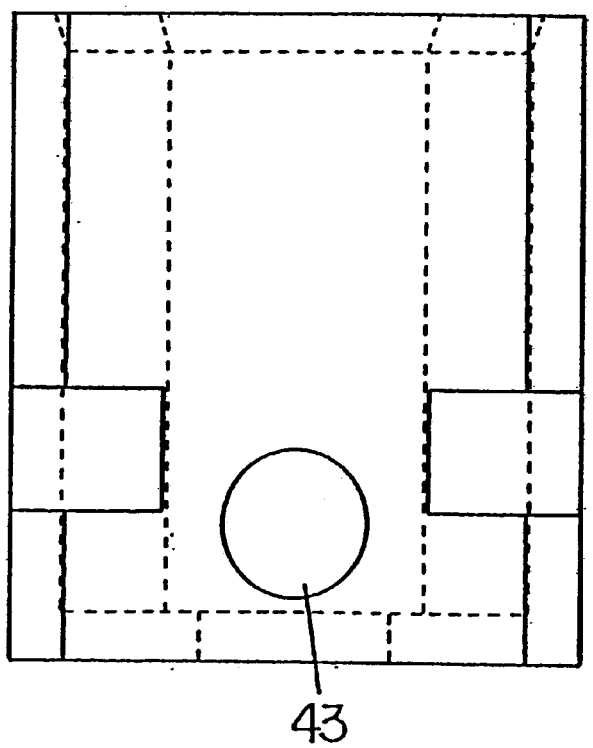

The retainer 41 shown in FIGS. 9(a) and 9(b) is similar to the retainer 1 shown in FIG. 1 (the constituting elements which are the same as in the retainer 1 are labeled with the same numbers in FIGS. 9(a) and 9(b)). However, this retainer 41 differs from the retainer 1 in that a pair of suction plate insertion holes 42 and 43 are formed in both sides of the lower portions of the side walls of the retainer 41. The pair of suction plate insertion holes 42 and 43 pass through to the retaining hole 5 from the outer circumferential surfaces 2a and 2b in a direction perpendicular to the axis of the insertion grooves 6.

During the opening process of a packaging bag in this retainer 41, suction plates are respectively inserted through the suction plate insertion holes 42 and 43, and the lower portions of both sides of the bag are held by suction and pulled sideways, so that the lower portion of the self-standing packaging bag, which is difficult to open, can be easily opened. At the same time, another pair of vacuum suction plates hold both sides of the upper portion of the packaging bag (the portion that is outside the retainer 41) by vacuum suction and open the bag; and further air is blown into the bag if necessary.

Figure 10A:
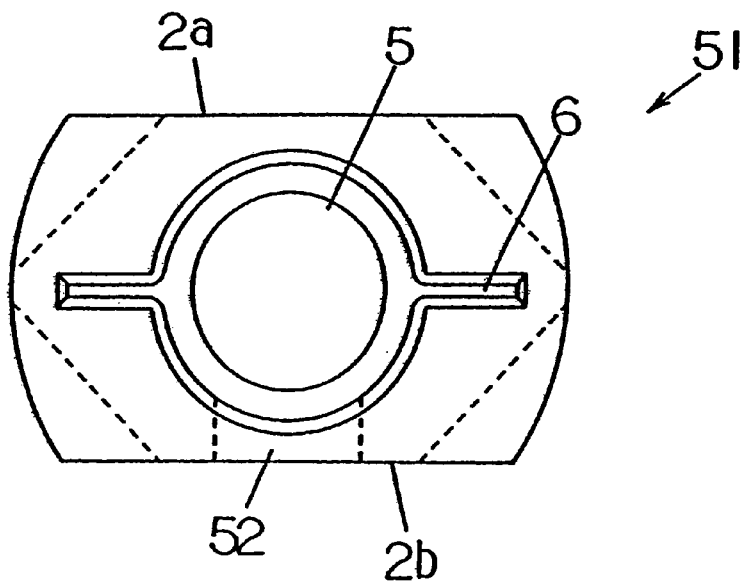
FIG. 10(*a*) is a top view of the retainer according to still another embodiment of the present invention, and FIG. 10(*b*) is a front view thereof.
Figure 10B:
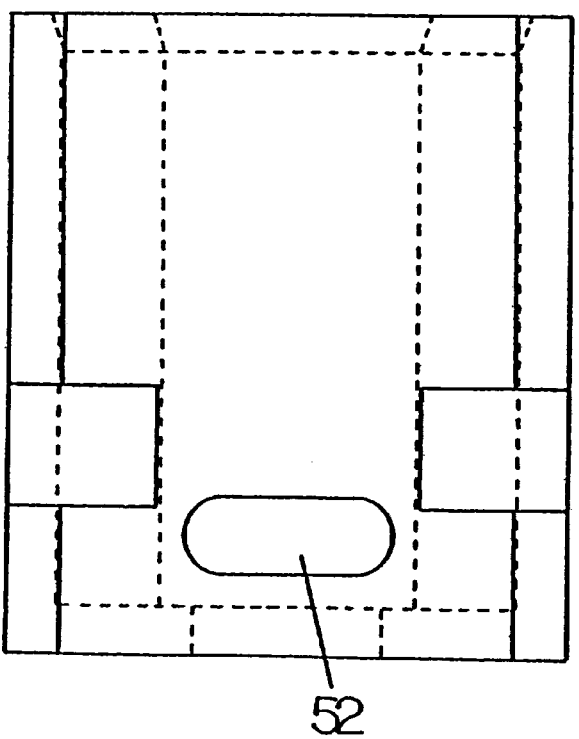

The retainer 51 shown in FIGS. 10(a) and 10(b) is similar to the retainer 1 shown in FIG. 1 (the constituting elements which are the same as in the retainer 1 are labeled with the same numbers in FIGS. 10(a) and 10(b)). The retainer 51, however, differs from the retainer 1 in that a printing hole 52 which passes through to the retaining hole 5 from the outer circumferential surface 2b is formed in the lower portion of the side wall of the retainer 51.

Ink is sprayed onto the surface of a packaging bag (that is in the retainer 51) from the print head of a fixed jet printer via this printing hole 52, so that, for example, the date of manufacture is printed on the bag. The printing can be performed on the packaging bag inside the retainer 51 that is being conveyed at a constant speed.

Figure 11A:
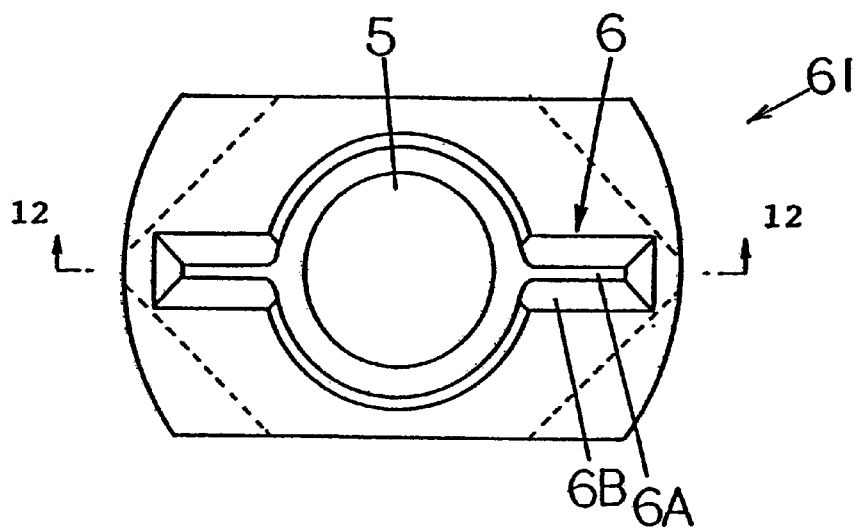
FIG. 11(*a*) is a top view of the retainer according to still another embodiment of the present invention, and FIG. 11(*b*) is a perspective view thereof.
Figure 11B:
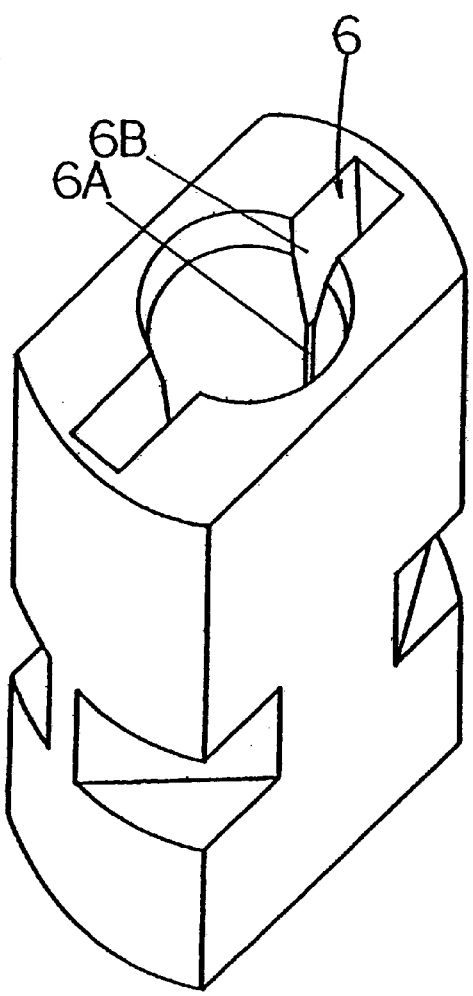

The retainer 61 shown in FIGS. 11(a) and 11(b) is also similar to the retainer 1 shown in FIG. 1 (the constituting elements which are the same as in the retainer 1 are labeled with the same numbers FIGS. 11(a) and 11(b)). This retainer 61, however, differs from the retainer 1 in the following aspects: each of the insertion grooves 6 consists of a lower region 6A which is formed by substantially perpendicular inside wall surfaces that extend to a specified height from the bottom of the groove, and an upper region 6B which has inside wall surfaces that form continuations to the inside wall surfaces of the lower region 6A and incline outward toward the top; and the upper regions 6B are formed so as to have a considerable depth.

Figure 12:
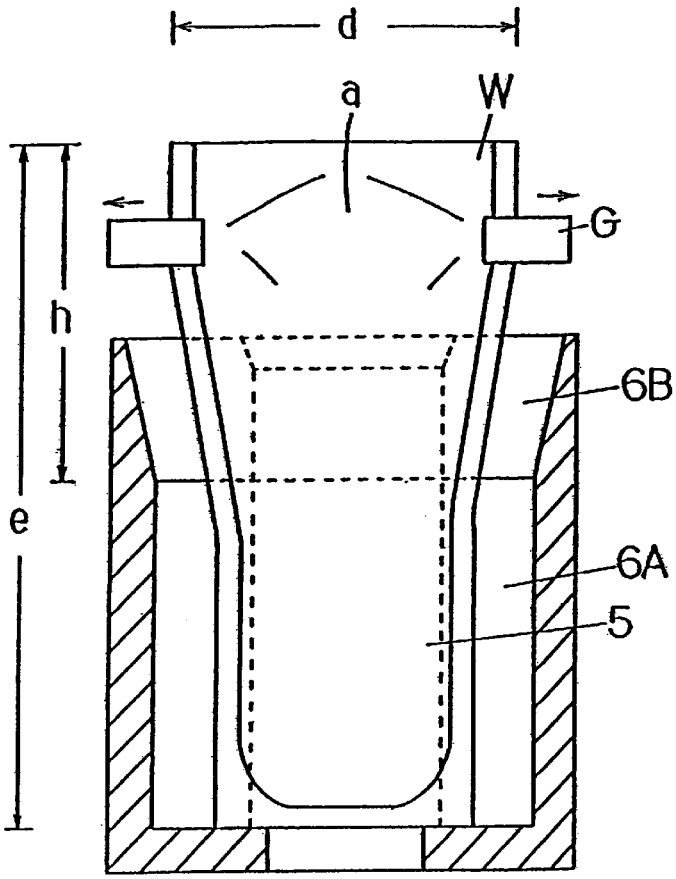
FIG. 12 is a sectional view taken along the line 12—12 in FIG. 11(*a*), showing both side edges of the packaging bag pulled into the insertion grooves.
Figure 13:
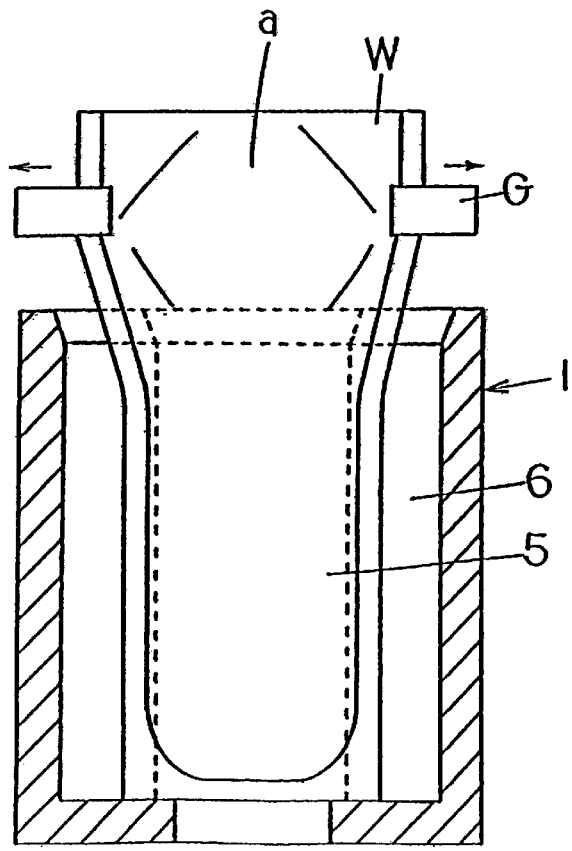
FIG. 13 shows substantially the same sectional view as FIG. 12, showing the situation wherein it is difficult to pull both side edges of the packaging bag into the insertion grooves in the retainer of the present invention.

Because of the thus formed upper regions 6B, a packaging bag can be easily inserted into the retainer 61 as in the case of the retainer 1 of FIG. 1. In this retainer 61, the end walls also incline outward toward the top in addition to the inside wall surfaces in the upper region 6B; however, this is not essential. The retainer 61 provides the effects and merits described below:

After the bag is filled with contents, both edges of the packaging bag are pulled sideways by grippers G as shown in FIGS. 12 and 13 so as to close the bag opening, and then the bag opening is heat-sealed by sealing bars. In the case of the retainer 1, as shown in FIG. 13, the body portion of the packaging bag W is bulging outward because of the filled contents. As a result, it is difficult to pull both edges of the bag W into the insertion grooves 6, which have a narrow width; and the slope of the spread of the edges of the packaging bag extending from the vicinity of the upper ends of the insertion grooves 6 to the grippers G becomes tight. Consequently, the portion between the grippers G is not flatly closed (a conical bulge a is formed), and wrinkles tends to be formed in the sealed area when the bag opening is heat-sealed by the sealing bars. To the contrary, in the retainer 61 shown in FIGS. 11(a) and 11(b), the width of the upper regions 6B of the grooves 6 is spread as seen from FIG. 11(b); thus, even if the body portion of the packaging bag W bulges due to the filled contents, both edges of the bag can enter into the wide upper regions 6B without any great resistance. Furthermore, both edges of the packaging bag up to the grippers G spread with a gradual slope, and the area between the grippers G can easily be closed in a flat manner (i.e., the conical bulge a is reduced in size). Accordingly, when the opening of the bag is heat-sealed by sealing bars, wrinkles are less likely occur in the sealed area. Furthermore, since the bulge a in FIG. 12 is small compared to that in FIG. 13, the amount of residual air inside the bulge a is also small, and there is little effect of the air (oxidation caused by residual air, etc.) on the contents.

As seen from FIG. 12, where the height h is from the upper edge of the packaging bag W to the lower end of the upper regions 6B, the slope of both edges of the packaging bag when pulled by the grippers G increases as the bag width increases if h is the same. As a result, the conical bulge a increases in size so that wrinkles tend to be formed in the sealed area. Accordingly, how deep the upper regions 6B should be set in the insertion grooves 6 of retainers varies depending upon the size of the packaging bag (i.e., the bag width). Furthermore, gripping by the grippers G and sealing by the seal bars are performed for the area extending from the upper edge of the packaging bag W to the upper ends of the insertion grooves 6, therefore, interference of the grippers G, sealing bars and retainer 61 must be avoided. Thus, regardless of how small the bag size is, the height h must be set greater than a certain value to avoid the interference.

A desirable depth for the upper regions 6B is experimentally determined from the standpoint described above. If the self-standing packaging bag is the one that has an ordinary vertical height, the height h is roughly 0.7×d or greater (where d is the bag width) and is also 50 mm or greater. The value of h may be selected from a range satisfying both of these requirements.

On the other hand, if the upper regions 6B are formed too deep, the lower regions 6A naturally become shallow; and a shallow lower region will interfere with the prevention of the recovery of a packaging bag from an open state. Accordingly, the height h is set at roughly 1.2×d or less and is also set at roughly 0.6×e or less (where e is the length of the packaging bag W); and the value of h may be selected from a range satisfying both of these requirements.

In this way, wrinkles during sealing can be suppressed, and the recovery (or closing) of the packaging bag from an open state can also be prevented. There may also be cases in which the upper regions 6B are not formed in the insertion grooves 6. In these cases, a similar effect can be obtained by setting the distance between the upper end of the packaging bag and the upper end of the retainer as described above.

If the angle of inclination of the inside wall surfaces in the upper regions 6B is too great, the packaging bag W will tend to close from an open state; on the other hand, if this angle is too small, it becomes difficult for both side edges of the packaging bag to advance into the narrow insertion grooves 6B. Accordingly, although this is not a specific limitation, it is advisable to set the inclination of one side of each of the upper regions to be in the range of 8 to 37 degrees, preferably in the vicinity of 15 degrees.

As seen from the above, the present invention provides a retainer in which a self-standing packaging bag in a closed state is inserted into the retaining hole and insertion grooves of a retainer, and the open state of the bag that is obtained when the bag is opened following insertion can be maintained during various packaging operations. In addition, the retainer does not have a complicated structure.

What is claimed is:

1. A retainer for self-standing packaging bags supplied to a bag-packing packaging machine, the retainer comprising:
    a retaining hole which has a bottom and is vertically provided in said retainer, a cross section of said retaining hole being capable of accommodating a body portion of an open self-standing packaging bag, and
    a pair of insertion grooves which are vertically provided in said retainer so that both side edges of said self-standing packaging bag are inserted therein, said insertion grooves being at symmetrical positions on both sides of said retaining hole, and wherein
    a depth of said retaining hole and insertion grooves is set so as to be smaller than a length of said self-standing packaging bag, and
    an outside surface of said open self-standing packaging bag contacts an inside surface of said retaining hole near said insertion grooves or an inside surface of boundary areas between said retaining hole and insertion grooves, so that said self-standing packaging bag in an open state is prevented from closing.

2. A retainer for self-standing packaging bags supplied to a bag-packing packaging machine, the retainer comprising:
    a retaining hole which has a bottom and is vertically provided in said retainer, a cross section of said retaining hole being capable of accommodating a body portion of an open self-standing packaging bag, and
    a pair of insertion grooves which are vertically provided in said retainer so that both side edges of said self-standing packaging bag are inserted therein, said insertion grooves being at symmetrical positions on both sides of said retaining hole, and wherein
    a depth of said retaining hole and insertion grooves is set so as to be smaller than a length of said self-standing packaging bag, and an angle between a direction of extension of said inside surfaces of said bottomed retaining hole and a direction of extension of said insertion grooves in said boundary areas between said bottomed retaining hole and said insertion grooves is set at 90 degrees or a value close to 90 degrees.

3. The retainer according to claim 1, wherein a cross-section of said retaining hole is one selected from the group consisting of a circular shape, elliptical shape and racetrack-shape.

4. The retainer according to claim 2, wherein a cross-section of said retaining hole is one selected from the group consisting of a circular shape, elliptical shape and racetrack-shape.

5. A retainer for self-standing packaging bags supplied to a bag-packing packaging machine, the retainer comprising:

a retaining hole which has a bottom and is vertically provided in said retainer, a cross section of said retaining hole being capable of accommodating a body portion of an open self-standing packaging bag, and a pair of insertion grooves which are vertically provided in said retainer so that both side edges of said self-standing packaging bag are inserted therein, said insertion grooves being at symmetrical positions on both sides of said retaining hole, and wherein a depth of said retaining hole and insertion grooves is set so as to be smaller than a length of said self-standing packaging bag, and projections, which protrude inward and are continuous to said inside surface of said retaining hole, are integrally formed in boundary areas between said retaining hole and insertion grooves.

6. The retainer according to claim 5, wherein an angle between a direction of extension of said inside surfaces of said bottomed retaining hole and a direction of extension of said insertion grooves in said boundary areas between said bottomed retaining hole and said insertion grooves is set at 90 degrees or a value close to 90 degrees.

7. The retainer according to claim 6, wherein a cross-section of said retaining hole is one selected from the group consisting of a circular shape, elliptical shape and racetrack-shape.

8. A retainer for self-standing packaging bags supplied to a bag-packing packaging machine, the retainer comprising:

a retaining hole which has a bottom and is vertically provided in said retainer, a cross section of said retaining hole being capable of accommodating a body portion of an open self-standing packaging bag, and a pair of insertion grooves which are vertically provided in said retainer so that both side edges of said self-standing packaging bag are inserted therein, said insertion grooves being at symmetrical positions on both sides of said retaining hole, and wherein a depth of said retaining hole and insertion grooves is set so as to be smaller than a length of said self-standing packaging bag, and projections that undergo elastic deformation are provided at boundary areas between said bottomed retaining hole and insertion grooves, and said projections are respectively oriented toward an inside of said retaining hole and protrude so that spaces between tip ends of said projections become narrower toward said tip ends of said projections.

9. The retainer according to any one of claims 1 through 8, wherein a pair of suction plate insertion holes, which are oriented perpendicular to said insertion grooves and pass through said retainer from an outer circumferential surface thereof to said retaining hole, are formed in both sides of lower portions of side walls of said retainer.

10. The retainer according to any one of claims 1 through 8, wherein each of said pair of insertion grooves comprises a lower region which has substantially vertical inside wall surfaces extending from bottoms of said insertion grooves to a specified height and an upper region which has inside wall surfaces that are continuous to an inside wall surface of said lower region and are inclined outward toward a top of said retainer.

11. The retainer according to claim 9, wherein each of said pair of insertion grooves comprises a lower region which has substantially vertical inside wall surfaces extending from bottoms of said insertion grooves to a specified height and an upper region which has inside wall surfaces that are continuous to an inside wall surface of said lower region and are inclined outward toward a top of said retainer.

* * * * *